(12) United States Patent
Wilbert et al.

(10) Patent No.: US 12,306,994 B2
(45) Date of Patent: May 20, 2025

(54) USER-CENTRIC DATA MANAGEMENT SYSTEM

(71) Applicant: SAP SE, Walldorf (DE)

(72) Inventors: Anja Wilbert, Munich (DE); Oliver Latka, Penzberg (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 18/069,432

(22) Filed: Dec. 21, 2022

(65) Prior Publication Data

US 2024/0211554 A1  Jun. 27, 2024

(51) Int. Cl.
*G06F 21/62* (2013.01)
*G06F 21/31* (2013.01)
*H04L 9/32* (2006.01)
*H04L 9/00* (2022.01)
*H04L 9/40* (2022.01)

(52) U.S. Cl.
CPC .......... *G06F 21/6272* (2013.01); *G06F 21/31* (2013.01); *H04L 9/32* (2013.01); *H04L 9/321* (2013.01); *G06F 21/6218* (2013.01); *G06F 2221/2103* (2013.01); *H04L 9/50* (2022.05); *H04L 63/10* (2013.01)

(58) Field of Classification Search
CPC ............. G06F 21/6218; G06F 21/6272; G06F 12/1408; G06F 12/1466; G06F 16/152; G06F 16/182; G06F 21/31; G06F 21/604; G06F 21/6245; G06F 2221/2137; G06F 2221/2141; G06F 21/62; G06F 3/0623; G06F 3/0637; G06F 3/067; G06F 2221/2103; H04L 9/0637; H04L 9/0844; H04L 9/50; H04L 67/1097; H04L 9/0825; H04L 9/3239; H04L 9/321; H04L 63/10; H04L 63/102; H04L 63/108; H04L 63/101
See application file for complete search history.

(56) References Cited

U.S. PATENT DOCUMENTS

| | | | |
|---|---|---|---|
| 11,093,933 B1* | 8/2021 | Peng | H04L 9/3239 |
| 2018/0115426 A1* | 4/2018 | Andrade | H04L 9/3231 |
| 2019/0197217 A1* | 6/2019 | Donovan | G06F 11/3476 |
| 2020/0153606 A1* | 5/2020 | Li | H04L 9/3239 |
| 2021/0099313 A1* | 4/2021 | Kondrashov | H04L 67/5683 |
| 2023/0164143 A1* | 5/2023 | Richardson, IV | H04L 63/0876 726/6 |

* cited by examiner

*Primary Examiner* — Shaqueal D Wade-Wright
(74) *Attorney, Agent, or Firm* — Buckley, Maschoff & Talwalkar LLC

(57) ABSTRACT

Systems and methods include reception of a request to validate the identity of a first entity associated with a decentralized identifier, validation of the identity of the first entity based on the decentralized identifier and on a verifiable data registry, requesting, in response to validation of the first entity, first consent from a first user to provide data associated with the user to the first entity, reception of the first consent from the first user; and, in response to receipt of the first consent, store an indication of the first entity, the first user and the first consent in a first data store associated with the first user, and provide the data associated with the user from the first data store to the first entity.

20 Claims, 8 Drawing Sheets

USER-CENTRIC DATA MANAGEMENT SYSTEM

BACKGROUND

Modern enterprise computing systems often consist of a landscape of applications and data stores which operate to provide functionality to the members and users (e.g., customers) of an enterprise. The data stores typically store data which is related to users, and which is intended to facilitate processing of transactions associated with the users. Moreover, this data is used to better understand the users' needs and to provide personalized service to users.

The usefulness of user data to an enterprise depends on the amount, type and reliability of user data stored by the enterprise. An enterprise typically has access to and therefore stores only a partial representation of the universe of digital data which is associated with a given user. An enterprise may be incented to store less than all the data to which the enterprise has access in order to limit the attractiveness of the stored data to data piracy and the concomitant liability. Increasing governmental requirements on what user-specific data may be stored, how the data may be used, and the duration of such storage further shrink the amount of data usable by enterprises. The data associated with a given user may also change over time, causing the corresponding data stored by an enterprise to become outdated. The foregoing factors limit the insights which might otherwise be gleaned from user data.

From the point of view of the user, each enterprise maintains a separate identity which corresponds to the user. The user has little control over the data which an enterprise associates with her identity. In order to facilitate transactions with several different enterprises and receive some level of personalization therewith, the user must separately provide her data to each enterprise. Moreover, the user is required to authenticate herself to the enterprise in order to access the user's own associated data.

Credentials pose an additional problem in the digital realm. No satisfactory system exists for digitally providing educational qualifications (e.g., a university degree), licensing certifications (e.g., a driver's license), governmental documentation (e.g., a passport), and other sorts of third-party verified machine-readable personal information to an enterprise. Consequently, credential submission and verification is still largely performed offline using paper and therefore cannot be incorporated into digital workflows.

While user-specific data is vital for allowing an enterprise to perform necessary and desired processes, users are less and less likely to simply share all requested data. Any user-specific data collected by an enterprise comes with an increasing demand for privacy, convenience, transparency, and security. Moreover, users desire control over data usage, flow, access periods, value, and insights derived therefrom. Systems are needed to efficiently share and use private data and credentials in a cryptographically secure, privacy-respecting, and machine-verifiable manner.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments provide decoupled and service-based entity validation, consent-driven data sharing, and credential verification for users and enterprises. Embodiments also support a single source of truth for user-specific data and credentials, as opposed to duplicative storage of such information in disparate enterprise data stores. Moreover, embodiments may enable secure and user-consented exchange of this data between enterprises. The exchanged data may be enriched by each enterprise's user-specific transaction data, assuming mutual user consent, to create aggregated user profiles which facilitate hyper-personalization of enterprise services and/or creation of new enterprise services which were previously not possible.

Some embodiments may include a broker service and a data management service that provide validated, trusted and up-to-date user data to enterprises based on user consent. In some embodiments, the data is made available in accordance with generally applicable standards which are fully compliant with General Data Protection Regulation (GDPR), thereby reducing the burden of GDPR compliance. Enterprises may consequently experience a reduction in administration costs, increased tax compliance, and increased velocity and visibility of transactions with users. Users retain ownership and control over their data and are able to receive value in exchange for shared data.

Figure 1:
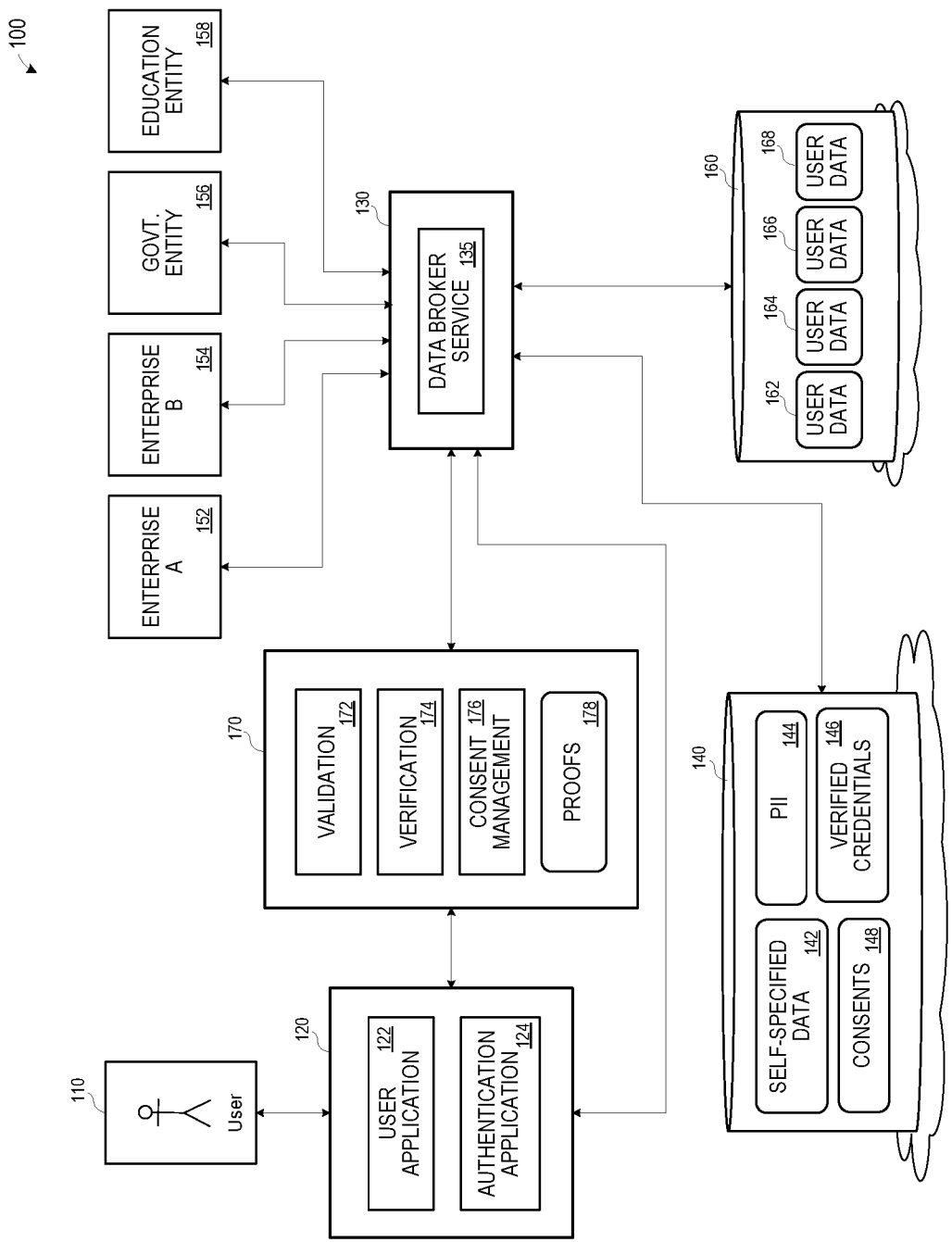
FIG. 1 is a block diagram of an architecture for managing user-centric data according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service). A cloud-based implementation of any elements of system 100 may apportion computing resources elastically according to demand, need, price, and/or any other metric.

Architecture 100 includes user 110 operating user device 120. User device 120 may comprise any suitable computing device, including but not limited to a laptop computer, a desktop computer, a smartphone, and a smart watch. User device 120 includes one or more processing units (e.g., Central Processing Units (CPUs), processor cores, processor threads) for executing program code of user application 122 and authentication application 124. User application 122 may comprise a client application suitable for communicating with data management service 170 as will be described below. In some embodiments, user application 122 comprises a Web application executing within a virtual machine of a Web browser executed by user device 120.

Authentication application 124 may provide a verifiable identity of user 110 to third-party applications. Authentication application 124 may implement, for example, OpenID Connect (OIDC), an identity layer built on top of the OAuth 2.0 framework. OIDC uses JSON web tokens (JWTs) to allow third-party applications to verify the identity of an end-user (e.g., user 110) and to obtain basic user profile information.

User application 122 may communicate with data broker service 135 executing on platform 130. Platform 130 may comprise an on-premise, cloud-based, or hybrid computing platform providing an execution platform and services to software applications. Platform 130 may comprise one or more virtual machines executing program code of an application server.

User application 122 may communicate with service 135 to create, read, update or delete user-specific data stored in personal data storage 140. Personal data storage 140 may comprise a data lake or implement any other data storage paradigm that is or becomes known. Personal data storage 140 may store data specific to many different users in a secure siloed manner. That is, data which is stored in personal data storage 140 and specific to a particular user is only accessible to the particular user. The particular user may also consent to access to specific portions of the user-specific data by specific third parties for specific time periods as will be described below.

Personal data storage 140 includes self-specified data 142, personal identifying information 144, consents 146 and verified credentials, but embodiments are not limited thereto. Self-specified data 142 may include data which user 110 has provided to service 135 for storage in personal data 140. Self-specified data 142 may comprise preferences of user 110 (e.g., travel, meal, operating system) as defined by user 110. The data of self-specified data 142 may be stored in personal data storage 140 without passing through a verification process, as opposed to other data described below.

Personal identifying information 144 may include any information that permits the identity of user 110 to be reasonably inferred by either direct or indirect means. Personal identifying information 144 may include but is not limited to a social security number, a passport number, an address, a telephone number, and a full name. Personal identifying information 144 may also be specified by user 110 via user application 122 and service 135.

Each of entities 152, 154, 156 and 158 may request data from a user via data broker service 135. Each of entities 152, 154, 156 and 158 may also provide data for storage in a user's personal data storage 140 using service 135. Such data may include a user history, user preferences, etc., and also credentials which may be verified as will be described below. Each of entities 152, 154, 156 and 158 may store data associated with its users in a respective one of user data 162, 164, 166 and 168 of cloud storage 160.

For example, enterprise A 152 may comprise an airline which requires a user's name, address and date of birth in order to book a ticket for the user. The airline may also possess loyalty program information associated with the user and which may be requested by the user. Enterprise B may comprise an employer of user 110 and may store salary data for the user. Government entity 156 may comprise an entity in charge of issuing drivers' license or passports, for example, and education entity 158 may comprise a university including degree and transcript information associate with user 110.

Data management service 170 includes validation component 172. Validation component 172 validates the identities of parties to a transaction. Validation component 172 executes a protocol to ensure each party to a transaction that the other party is who they say they are. Validation component 172 may utilize an authentication method of a globally unique persistent identifier that does not require a centralized registration authority because it is generated and/or registered cryptographically, such as a Decentralized Identifier (DID). For example, DID Auth is an authentication method which relies on a challenge-response cycle in which a relying party authenticates the DID of an identity owner. During this cycle, an identity owner demonstrates control of their authentication material that was generated and distributed during DID Record Creation through execution of an authentication-proof mechanism. The resulting proof is stored in proofs 178 which may comprise a verifiable data registry such as but not limited to a distributed ledger.

Verification component 174 may verify credentials associated with users in response to a request from an entity. For example, verification component 174 may consult a verifiable data registry (e.g., trusted databases, decentralized databases, government ID databases, and distributed ledgers) to verify that a credential was issued by a given issuer to a given user. Proofs 178 may also store proofs required for credential verification according to some embodiments. Verified credentials may be stored in verified credentials 146 of personal data storage 140 of the given user. Verified credentials 146 may simply store identifiers of verified credentials (and/or of associated proofs 178) which reference a single source of truth (i.e., the actual credential) stored in the user data of the credential-issuing entity.

Consent management component 176 may communicate with user application 122 to record consent information in consents 148 of personal data storage 140. Consents 148 may associate a user identifier with an identifier of an entity and with data 142, 144 and/or 146 which the user has allowed the entity to access. According to some embodiments, the data identified in a consent 148 may be data derived from data 142, 144 and/or 146. For example, in a case that the entity is a car rental agency, rather than consent to providing all details of a user's driver's license referenced in verified credentials 146 to the agency, a user may consent to confirming possession of a valid driver's license and being over 25 years old.

Figure 2:
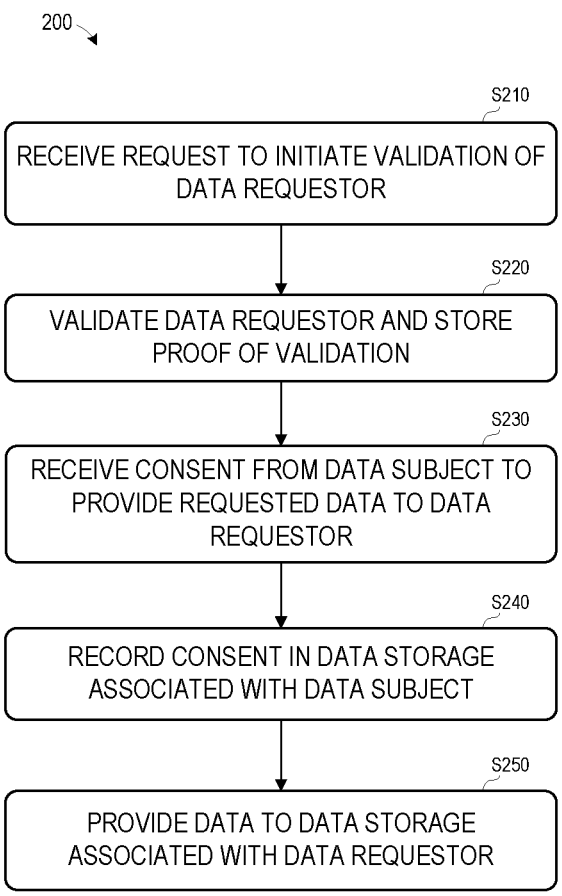
FIG. 2 is a flow diagram of a process to provide private user data to a data requestor according to some embodiments.

FIG. 2 comprises a flow diagram of a process to provide private user data to a data requestor according to some embodiments. Process 200 and all other processes mentioned herein may be embodied in processor-executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software.

Initially, at S210, a request to initiate validation of a data requestor is received. Validation of a data requestor is intended to confirm, to a data subject (e.g., a user), the identity of an entity requesting particular data from the user. In some embodiments, the request is a DID authentication challenge. As is known in the art, the DID authentication challenge may include a request for specific data.

For example, an airline may provide a QR code or a bar code to user 110 for purposes of gathering passenger information from user 110. User 110 may operate device 120 to scan the code, which results in opening of application 122 and transmission of a DID authentication challenge to validation component 172 of data management system 170. In this regard, the code encodes the DID authentication challenge and device 120 is configured to use application 122 to process such challenges.

Next, at S220, validation component 172 validates the data requestor and stores proof of the validation (e.g., in proofs 178). Accordingly, user 110 may now and in the future rely on the fact that the identifier (e.g., the DID) provided by the data requestor identifies the stated data requestor (e.g., the airline). A governmental entity may generate and record the DID for a business which is then validated at S220. Validation may occur according to any validation scheme that is or becomes known and may implement a decentralized identifier scheme.

Figure 3:
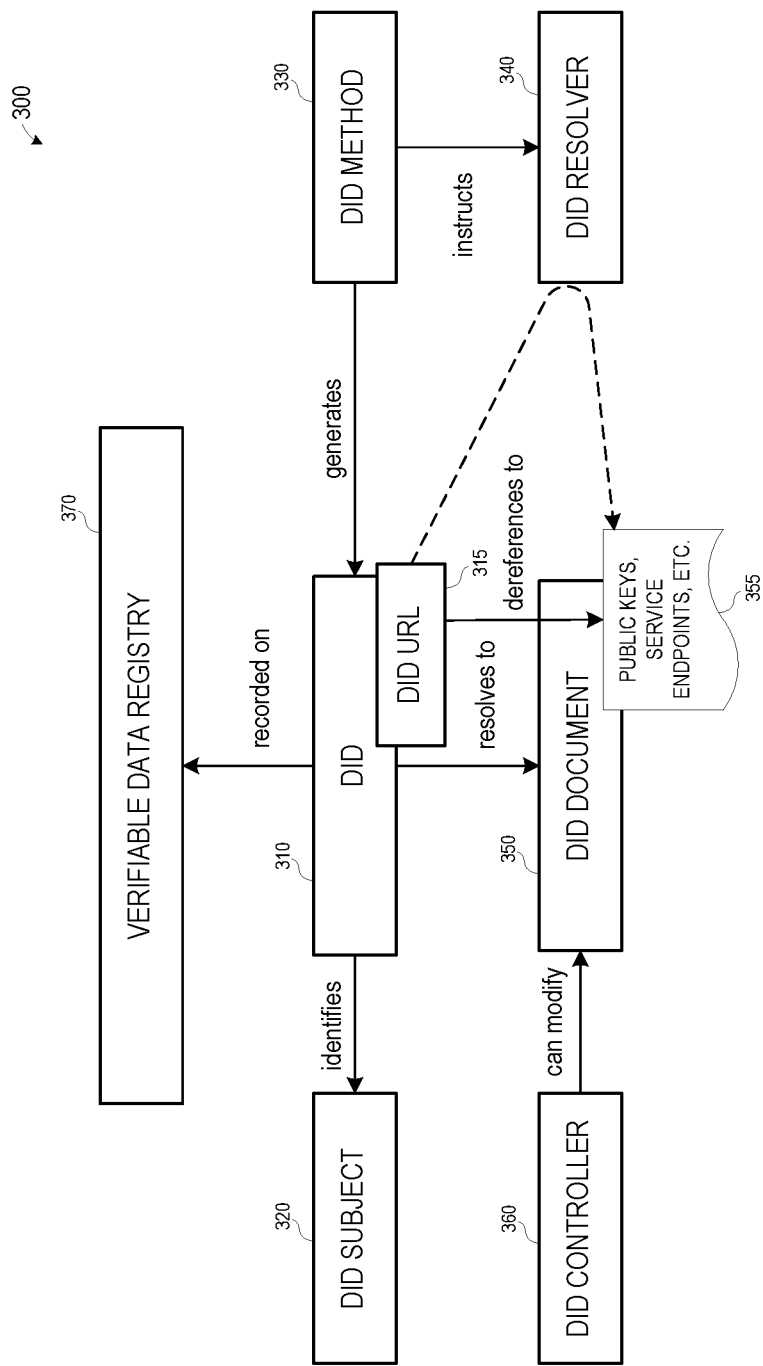
FIG. 3 depicts entity validation according to some embodiments.

FIG. 3 depicts entity validation architecture 300 according to some embodiments. DID 310 identifies DID subject 320. DID subject 320 may be any entity such as but not limited to a person, a group, an organization, a physical thing, and a logical thing.

DID 310 is generated by a DID scheme defined in DID method 330. DID method 330 is the mechanism by which a particular type of DID 310 and its associated DID document 350 are created, resolved, updated, and deactivated using a particular verifiable data registry 370. For example, in order to be resolvable to DID document 350, DIDs are typically recorded on an underlying system or network. Regardless of the specific technology used, any such system that supports recording DIDs and returning data necessary to produce DID documents is referred to as a verifiable data registry. Examples of verifiable data registry 370 include distributed ledgers, decentralized file systems, databases, peer-to-peer networks, and other forms of trusted data storage.

DID document 350 contains metadata associated with DID 310 and may express verification methods (such as public keys) and services relevant to interactions with DID subject 320. The properties of DID document 350 may be updated according to applicable operations specified in DID method 330.

DID URL 315 extends the syntax of DID 310 to incorporate other standard URI components (e.g., path, query, fragment) in order to locate a particular resource. The resource may be a public key 344 inside DID document 350, or a resource available external to DID document 350.

DID resolver 340 is a software and/or hardware component that produces a conforming DID document 350 (and associated metadata) from DID 310. The specific steps for resolving a specific type of DID 310 are defined by the relevant DID method 330. Similarly, a resource 355 (and associated metadata) may be generated from DID URL (and associated options) 315 in a process known as dereferencing.

DID controller 360 of DID 310 is an entity (e.g., person, organization, or autonomous software) that is capable of modifying DID document 350 according to DID method 330. This capability is typically asserted by the control of a set of cryptographic keys used by software acting on behalf of DID controller 360. DID 310 may be associated with more than one controller and DID controller 360 may include DID subject 320.

Similar to other authentication methods, DID relies on a challenge-response cycle in which a relying party authenticates the DID of an identity owner. During this cycle, an identity owner demonstrates control of their authentication material that was generated and distributed during DID creation through execution of the authentication-proof mechanism. If the DID is known at the time of challenge construction, then the relying party may use the contents of the DID document to select preferred authentication methods or service endpoints. The challenge that is sent by the relying party may or may not itself contain a proof of the relying party's control of a DID.

Based on the challenge, the identity owner constructs a response that proves control of their DID. This may involves a cryptographic signature but can include other proof mechanisms. After receiving the response, the relying party resolves the identity owner's DID, and verifies that the response is valid for a prior challenge, for example, by verifying the response signature using a public key contained in the DID document.

Validation of the data requestor establishes a secure connection between the user and the data requestor. At S230, consent is received from the data subject to provide requested data to the data requestor. The data may be requested by the data requestor within the DID challenge as is known in the art. Alternatively, the data may be requested after successful validation via consent management component 176 of service 170.

User 110 may operate user application 122 to consent to provide particular data to the data requestor. Accordingly, a record of this consent may be stored in consents 148 of personal data storage 140 associated with user 110 at S240. The stored record may associate a DID of user 110, a DID of the data requestor, and an identifier of the data which user 110 has consented to provide to the data requestor. In some embodiments, the record also specifies an expiration time after which the consent is no longer to be considered valid. The data may comprise data stored in self-specified data 142, PII 144 and/or verified credentials 146.

The data requestor may request additional data via data broker service 135 and data management service 170, and user 110 may operate user application 122 to consent to providing such data. Again, consent management 176 stores a record of such consent in consents 148.

The requested data is provided to a data storage associated with the data requestor at S250. In some embodiments, data broker service 135 transfers the data from personal data storage 140 to user data of storage 160 which is associated with the data requestor. Data broker service 135 may alternatively instruct storage 140 to transmit the data to the appropriate user data of storage 160. As mentioned above, in some embodiments the data is an identifier of a verified credential, in which case the identifier is stored. Accordingly, the data requestor may request data associated with the verified credential from the issuer of the credential, for example using a DID authentication challenge as described with respect to process 300.

Figure 4:
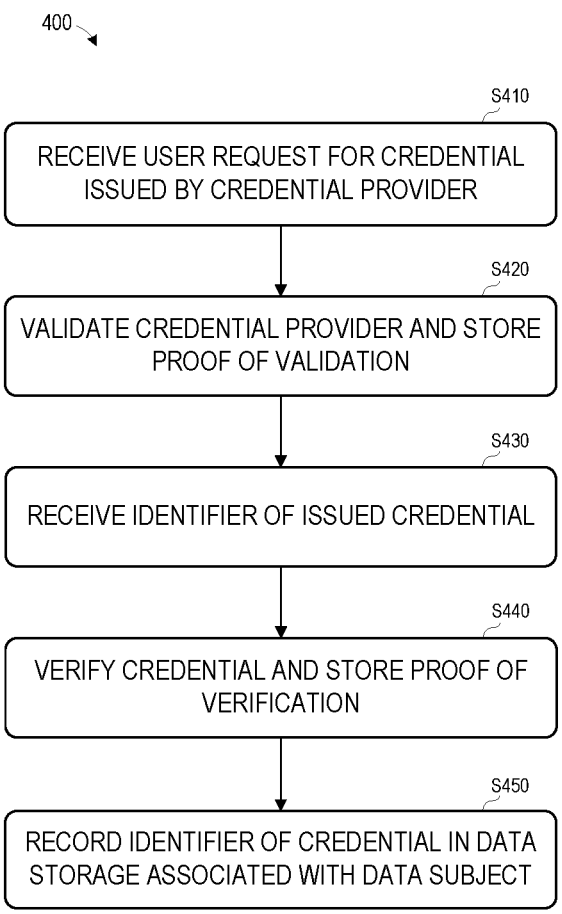
FIG. 4 is a flow diagram of a process to establish a verified user credential according to some embodiments.

FIG. 4 is a flow diagram of process 400 to receive a credential issued by a credential provider according to some embodiments. Process 400 may be executed, for example, in a case that a user wishes to store a credential (e.g., passport, university degree) in her personal data storage for subsequent selective sharing with desired entities (e.g., airlines, potential employers).

Initially, at S410, a request is received from a user for a credential issued by a credential provider. In one example of S410, user 110 operates user application 120 to request her passport from service 170. The request may include an identifier of the passport-issuing authority, or this identifier might be otherwise available to service 170 via a trusted data source such as a distributed ledger.

Next, at S420, the credential provider (e.g., the passport-issuing authority) is validated as described above with respect to process 200. The validation generates a proof of validation which is stored at S420. At S430, service 170 requests and receives an identifier of the issued credential from the credential provider over the now-secure connection thereto.

Verification component 174 of service 170 verifies the credential at S440 based on its identifier using any suitable mechanism. In some embodiments, the verification may be proof-based using a trusted database such as a distributed ledger. In such a case, the proof is stored in the distributed ledger (e.g., proofs 178) as described above.

Figure 5:
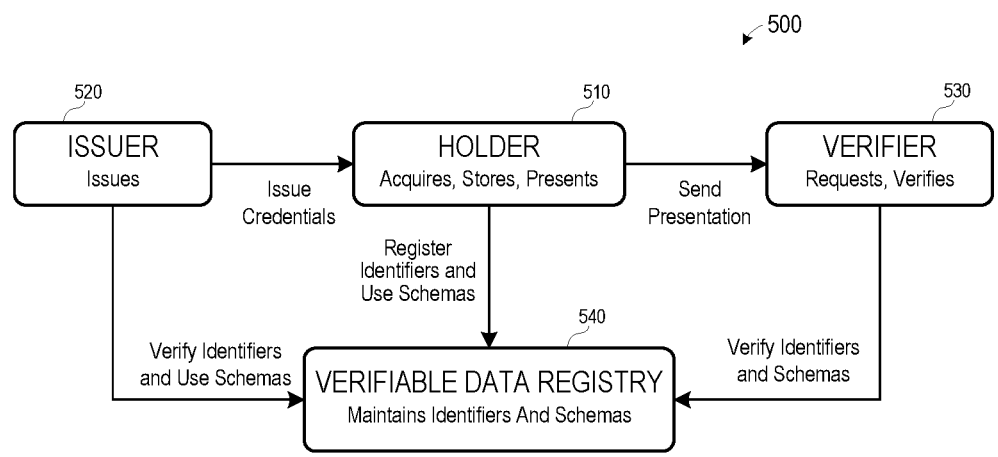
FIG. 5 depicts credential issuance and verification according to some embodiments.

FIG. 5 illustrates architecture 500 supporting verifiable credentials according to some embodiments. Holder 510 acquires and stores one or more verifiable credentials. Examples of holder 510 include students, employees, and customers. Holder 510 generates verifiable presentations from its one or more stored verifiable credentials. The verifiable credentials concern a subject, which may or may not be the same as the holder of the verifiable credentials. For example, a parent (holder) might hold the verifiable credentials of a child (subject), or a pet owner (holder) might hold the verifiable credentials of their pet (subject).

Issuer 520 asserts claims regarding one or more subjects, creates a verifiable credential from these claims, and transmits the verifiable credential to holder 510. Examples of issuer 520 include corporations, non-profit organizations, trade associations, governments, and individuals.

Verifier 530 requests one or more verifiable credentials, optionally inside a verifiable presentation. Verifier 530 then verifies the one or more verifiable credentials. Examples of verifier 530 include employers, security personnel, and websites.

Verifiable data registry 540 may comprise a trusted database, a decentralized database, a government database, or a distributed ledger. Verifiable data registry 540 mediates the creation and verification of identifiers, keys, and other relevant data such as verifiable credential schemas, revocation registries, and issuer public keys which might be required to use verifiable credentials.

Returning to process 400, an identifier of the verified credential is stored at S450. The identifier is stored in a data storage associated with the data subject (or the credential holder if different). For example, the identifier may be stored in verified credentials 146 of personal data storage 140.

Figure 6:
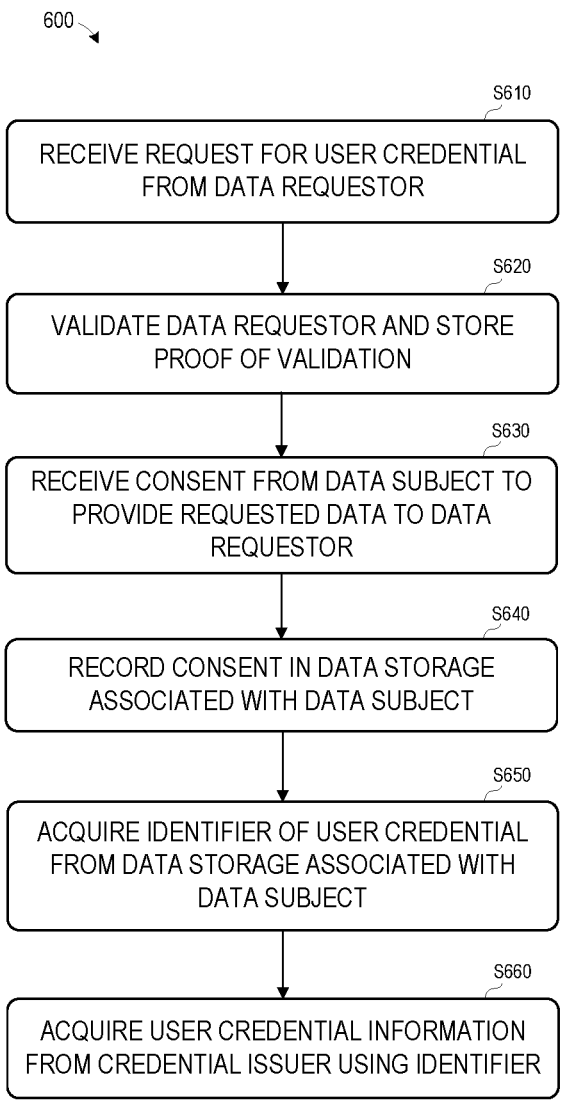
FIG. 6 is a flow diagram of a process to provide a verified user credential to a data requestor according to some embodiments.

FIG. 6 is a flow diagram of process 600 to provide a verified credential to a data requestor according to some embodiments. Process 600 may be executed, for example, in a case that a rental car company wishes to access the driver's license of a potential customer.

A request for a user credential is received from a data requestor at S610. At S620, the data requestor is validated and a proof of the validation is stored. S610 and S620 may be performed as described above with respect to S210 and S220 of process 200. The request may be embodied in a QR code which is scanned by user device 120 in order to cause user application 122 to issue an authentication challenge. The challenge is managed by validation component 172, which stores a resulting proof in proofs 178.

At S630, consent is received from the data subject to provide requested data to the data requestor. Again, user 110 may operate user application 122 to provide consent management component 176 with an indication of consent to provide the requested data to the data requestor. As described above, the requested data may comprise the credential itself and/or data which can be determined from the credential (e.g., that the subject is over 25 years old).

The consent is recorded in a data storage associated with the data subject at S640. For example, the consent may be recorded in consents 148 as described above. Next, at S650, service 135 acquires an identifier of the user credential from the data storage based on the stored consent. The identifier is used at S660 to acquire information regarding the user credential from the credential issuer. By acquiring the information from the credential issuer, embodiments support a single source of truth for the credential.

Acquisition of the credential information from the credential issuer may also include a validation between the data requestor and the credential issuer as described above. The data requestor may also consult a stored proof associated with verification of the credential in order to confirm that the credential has been verified.

Embodiments allow a user to control the dissemination of personal information to data requestors. Some embodiments further include mechanisms for facilitating the payment of compensation from data requestors to users who consent to providing their data. The payment amount may differ depending on the type of information provided and/or on the duration of consent.

Figure 7:
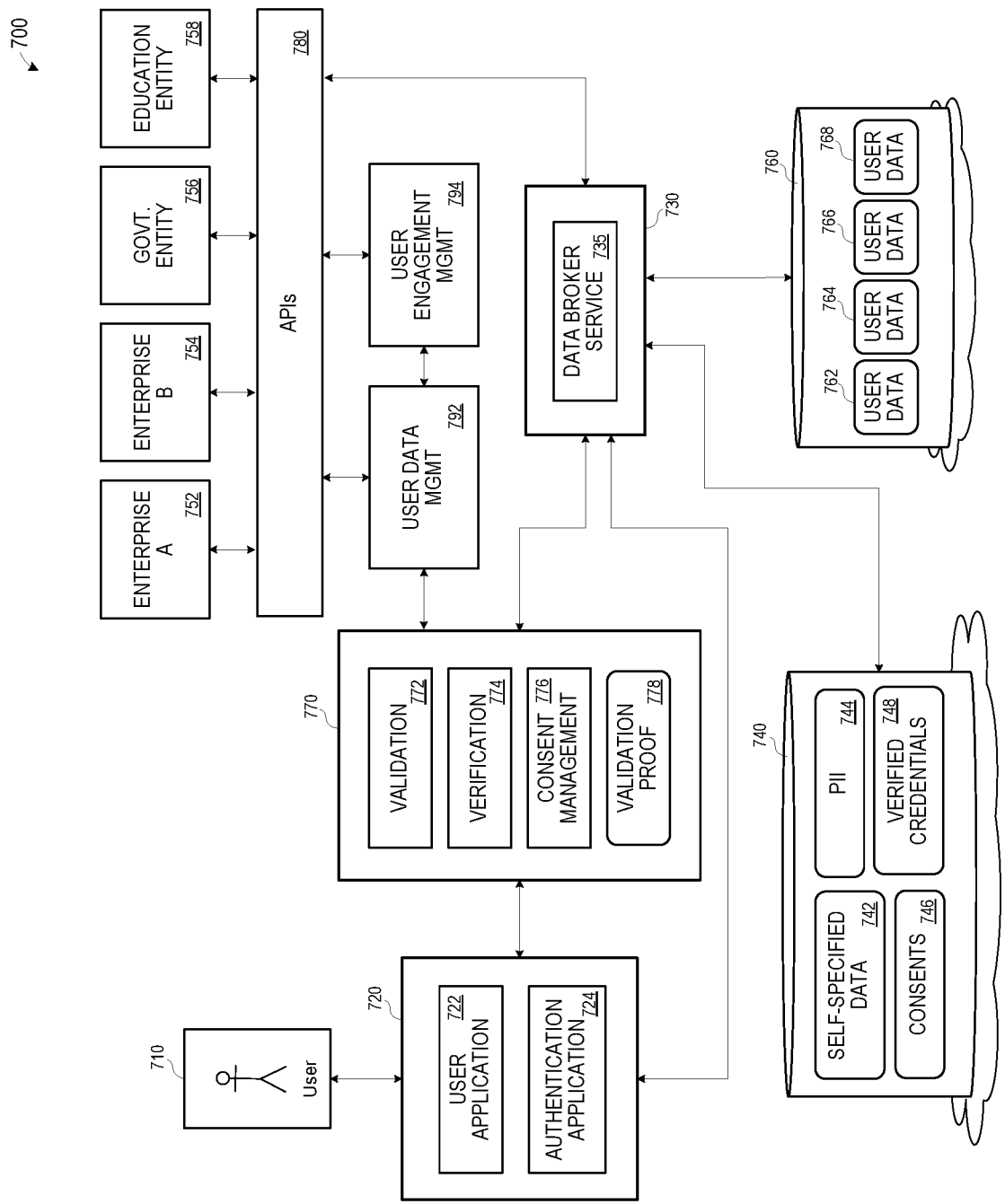
FIG. 7 is a block diagram of an architecture for managing user-centric data using an existing enterprise platform according to some embodiments.

Architecture 700 of FIG. 7 may comprise an implementation of architecture 100 but embodiments are not limited thereto. The various components of architecture 700 may function as described above with respect to similarly-numbered components of architecture 100.

Architecture 700 contemplates a scenario in which entities 752, 754, 756 and 758 use APIs 780 of an existing enterprise application to access user data management component 792 and user engagement management component 794 of the enterprise application. Accordingly, in order to provide entities 752, 754, 756 and 758 with the functionality described herein (e.g., to request data from their users/customers), the components of service 770 are configured to respond to calls from user data management component 792. Such an arrangement may facilitate communication with users/customers who are already known to component 792 and to respective ones of entities 752, 754, 756 and 758.

Figure 8:
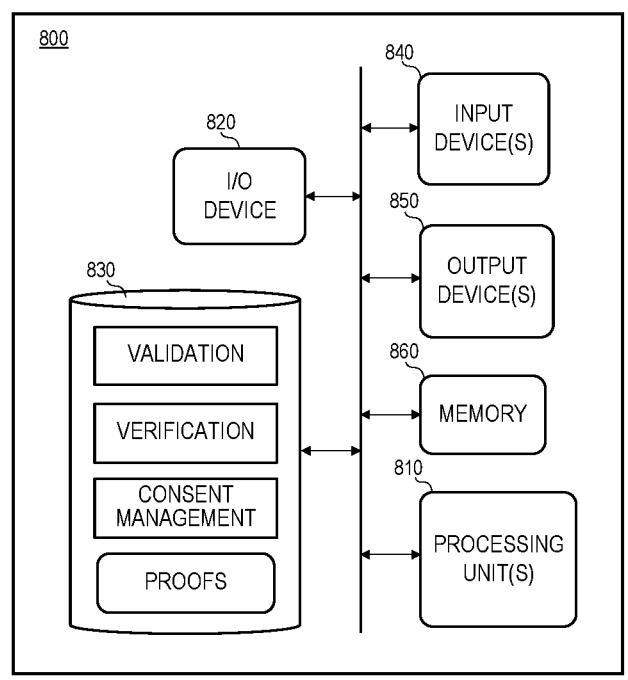
FIG. 8 is a block diagram of a hardware system providing a data sharing service according to some embodiments.

FIG. 8 is a block diagram of a hardware system according to some embodiments. Hardware system 800 may comprise a computer server and may execute program code to perform any of the functions described herein. Hardware system 800 may be implemented by a distributed cloud-based server, a virtual machine, or other implementation and may comprise an implementation of data management service 170 in some embodiments. Hardware system 800 may include other unshown elements according to some embodiments.

Hardware system 800 includes processing unit(s) 810 operatively coupled to I/O device 820, data storage device 830, one or more input devices 840, one or more output devices 850 and memory 860. I/O device 820 may facilitate communication with external devices, such as third-party posting platforms, an external network, the cloud, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into hardware system 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, and RAM devices, while memory 860 may comprise a RAM device.

Data storage device 830 stores program code executed by processing unit(s) 810 to cause system 800 to implement any of the components and execute any one or more of the processes described herein. Such processes may include but are not limited to entity validation, credential verification, and consent management.

Embodiments are not limited to execution of these processes by a single computing device. Data storage device 830 may also store data and other program code for providing additional functionality and/or which are necessary for operation of hardware system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
  a memory storing processor-executable program code; and
  a processing unit to execute the processor-executable program code to cause the system to:
  create a verifiable credential associated with a first user;
  store the verifiable credential and a public key associated with a creator of the verifiable credential in a verifiable data registry;
  receive a request for the verifiable credential from a first entity, the request including a decentralized identifier associated with the first entity;
  validate an identity of the first entity based on the decentralized identifier;
  in response to validation of the identity of the first entity, request and receive first consent from the first user to provide the verifiable credential to the first entity; and
  in response to receipt of the first consent:
    store an indication of the first entity, the first user and the first consent in a first data store associated with the first user;
    identify the public key stored in the verifiable data registry based on the stored verifiable credential;
    validate an identity of the creator based on the identified public key; and
    based on the validation of the identity of the creator and the stored first consent, provide the verifiable credential associated with the first user from the verifiable data registry to the first entity.

2. The system according to claim 1, wherein provision of the verifiable credential to the first entity comprises:
  instructing the verifiable data registry to provide the verifiable credential to a second data store associated with the first entity.

3. The system according to claim 1, the processing unit to further execute the processor-executable program code to cause the system to:
  receive a second request from the first user for a second verifiable credential associated with the first user and created by a second entity;
  in response to the second request, verify the second verifiable credential based on a second verifiable data registry; and
  in response to verification of the second verifiable credential, store an identifier of the second verifiable credential in the first data store associated with the first user.

4. The system according to claim 3, the processing unit to further execute the processor-executable program code to cause the system to:
  receive second consent from the first user to provide the second verifiable credential to a third entity; and
  in response to receipt of the second consent, provide the identifier of the second verifiable credential from the first data store to the third entity.

5. The system according to claim 4, wherein provision of the verifiable credential associated with the first user from the verifiable data registry to the first entity comprises instructing the first data store to provide the data to a second data store associated with the first entity, and
  wherein provision of the identifier of the second verifiable credential from the first data store to the third entity comprises instructing the first data store to provide the identifier of the second verifiable credential to a third data store associated with the third entity.

6. The system according to claim 1, the processing unit to further execute the processor-executable program code to cause the system to:
  in response to providing of the verifiable credential, providing a payment to the first user.

7. The system according to claim 6, wherein the verifiable credential specifies preferences of the first user.

8. A method comprising:
  creating a verifiable credential associated with a first user;
  storing the verifiable credential and a public key associated with a creator of the verifiable credential in a verifiable data registry;
  receiving a request for the verifiable credential from a first entity, the request including a decentralized identifier of the first entity;
  validating an identity of the first entity based on the decentralized identifier;
  in response to validation of the identity of the first entity, requesting and receiving first consent from the first user to provide the verifiable credential to the first entity; and
  in response to receipt of the first consent:

storing the decentralized identifier of the first entity and the first consent in a first data store associated with the first user;
identifying the public key stored in the verifiable data registry based on the stored verifiable credential;
validating an identity of the creator based on the identified public key; and
based on the validation of the identity of the creator and the stored first consent, providing the verifiable credential associated with the first user from the verifiable data registry to the first entity.

9. The method according to claim 8, wherein providing the verifiable credential to the first entity comprises:
instructing the verifiable data registry to provide the verifiable credential to a second data store associated with the first entity.

10. The method according to claim 8, further comprising:
receiving a second request from the first user for a second verifiable credential associated with the first user and created by a second entity;
in response to the second request, verifying the second verifiable credential based on a second verifiable data registry; and
in response to verification of the second verifiable credential, storing an identifier of the second verifiable credential in the first data store associated with the first user.

11. The method according to claim 10, further comprising:
receiving second consent from the first user to provide the second verifiable credential to a third entity; and
in response to receipt of the second consent, providing the identifier of the second verifiable credential from the first data store to the third entity.

12. The method according to claim 11, wherein providing the verifiable credential associated with the first user from the verifiable data registry to the first entity comprises instructing the first data store to provide the data to a second data store associated with the first entity, and
wherein providing the identifier of the second verifiable credential from the first data store to the third entity comprises instructing the first data store to provide the identifier of the second verifiable credential to a third data store associated with the third entity.

13. The method according to claim 8, further comprising:
in response to providing of the verifiable credential, providing a payment to the first user.

14. The method according to claim 13, wherein the verifiable credential specifies preferences of the first user.

15. A non-transitory computer-readable medium storing program code executable by a processing unit to:
create a verifiable credential associated with a first user;
store the verifiable credential and a public key associated with a creator of the verifiable credential in a verifiable data registry;
receive a request for the verifiable credential from a first entity, the request including a decentralized identifier associated with the first entity;
validate an identity of the first entity based on the decentralized identifier;
in response to validation of the identity of the first entity, request and receive first consent from the first user to provide the verifiable credential to the first entity; and
in response to receipt of the first consent:
store an indication of the first entity, the first user and the first consent in a first data store associated with the first user;
identify the public key stored in the verifiable data registry based on the stored verifiable credential;
validate an identity of the creator based on the identified public key; and
based on the validation of the identity of the creator and the stored first consent, provide the verifiable credential associated with the first user from the first verifiable data registry to the first entity.

16. The medium according to claim 15, wherein provision of the verifiable credential to the first entity comprises:
instructing the verifiable data registry to provide the verifiable credential to a second data store associated with the first entity.

17. The medium according to claim 15, the program code further executable by a processing unit to:
receive a second request from the first user for a second verifiable credential associated with the first user and created by a second entity;
in response to the second request, verify the second verifiable credential based on a second verifiable data registry; and
in response to verification of the second verifiable credential, store an identifier of the second verifiable credential in the first data store associated with the first user.

18. The medium according to claim 17, the program code further executable by a processing unit to:
receive second consent from the first user to provide the second verifiable credential to a third entity; and
in response to receipt of the second consent, provide the identifier of the second verifiable credential from the first data store to the third entity.

19. The medium according to claim 18, wherein provision of the verifiable credential associated with the first user from the verifiable data registry to the first entity comprises instructing the first data store to provide the data to a second data store associated with the first entity, and
wherein provision of the identifier of the second verifiable credential from the first data store to the third entity comprises instructing the first data store to provide the identifier of the second verifiable credential to a third data store associated with the third entity.

20. The medium according to claim 15, the program code further executable by a processing unit to:
in response to providing of the verifiable credential, providing a payment to the first user, wherein the data specifies preferences of the first user.

* * * * *